United States Patent
Handley (10) Patent No.: US 9,031,814 B2
(45) Date of Patent: May 12, 2015

(54) SYSTEMS AND METHODS FOR ESTIMATION AND DISPLAY OF A FAILURE COPULA FOR A CONSUMABLE

(75) Inventor: John C. Handley, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 845 days.

(21) Appl. No.: 13/299,456

(22) Filed: Nov. 18, 2011

(65) Prior Publication Data

US 2013/0132030 A1 May 23, 2013

(51) Int. Cl.
G06Q 10/00 (2012.01)
G06Q 10/08 (2012.01)

(52) U.S. Cl.
CPC ....................... *G06Q 10/08* (2013.01)

(58) Field of Classification Search
CPC ........................................ G06Q 10/08
USPC .......................................... 702/181
See application file for complete search history.

(56) References Cited

U.S. PATENT DOCUMENTS

| | | | |
|---|---|---|---|
| 2008/0005707 A1* | 1/2008 | Papanikolaou et al. | 716/4 |
| 2010/0312530 A1* | 12/2010 | Capriotti | 703/2 |
| 2012/0010867 A1* | 1/2012 | Eder | 703/13 |

OTHER PUBLICATIONS

Kelly, "Using Copulas to Model Dependence in Simulation Risk Assessment," Proceeding of IMECE2007, 2007 ASME International Mechanical Engineering Congress and Exposition, Nov. 15, 2007, Idaho, National Laboratory, Idaho Falls, ID.

* cited by examiner

*Primary Examiner* — Bryan Bui
(74) *Attorney, Agent, or Firm* — Fox Rothschild LLP (57) ABSTRACT

Methods and systems of determining a failure copula for a consumable are disclosed. Multiple consumable levels for a consumable and multiple timestamps are received from a device. Each timestamp is associated with one of the consumable levels. The consumable levels are ordered into a time-ordered sequence based on the associated timestamps. For at least one consumable level in the time-ordered sequence, a computing device determines a value associated with the consumable level based on at least one earlier and at least one later consumable level in the time-ordered sequence. The computing device identifies historical consumable replacement(s) based on the values associated with the consumable levels in the time-ordered sequence and determines one or more consumable lifetimes and one or more consumable yields based on the historical consumable replacement(s). The computing device determines a failure copula based on the one or more consumable lifetimes and consumable yields.

20 Claims, 8 Drawing Sheets

SYSTEMS AND METHODS FOR ESTIMATION AND DISPLAY OF A FAILURE COPULA FOR A CONSUMABLE

BACKGROUND

Consumables are used in a variety of devices to enable the device to perform its function. For example, a printing device may use toner or ink to make impressions on a physical media. Over time, the amount of a consumable in a device is consumed and needs to be replaced.

Consumables in devices that are installed in the field may have different lifetimes and yields than in devices in a lab or test environment. As a result, when a user's requests for consumables are compared with a rated yield, the consumables may be determined to be shipped too frequently or too soon.

Properly controlling consumable shipments to customers in base and managed services is a difficult task. One issue is that consumables are sent to customers too frequently. However, determining the proper frequency with which to send consumables is presently a difficult and time consuming operation because a number of variables may have an effect on the usage rate of the consumable.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of determining a failure copula for a consumable may include receiving a plurality of consumable levels for a consumable and a plurality of timestamps from a remote device, where each timestamp of the plurality of timestamps is associated with a consumable level of the plurality of consumable levels, ordering the plurality of consumable levels into a time-ordered sequence of consumable levels based on the associated timestamps, for at least one consumable level in the time-ordered sequence, determining, by a computing device, a value associated with the consumable level based on at least one earlier consumable level and at least one later consumable level in the time-ordered sequence, identifying, by the computing device, one or more historical consumable replacements based on the values associated with the at least one consumable level in the time-ordered sequence, determining, by the computing device, one or more consumable lifetimes and one or more consumable yields based on the one or more historical consumable replacements, and determining, by the computing device, a failure copula based on the one or more consumable lifetimes and the one or more consumable yields.

In an embodiment, a method of determining a failure copula for a consumable type may include, for each of a plurality of devices having a common device type: receiving a plurality of consumable levels for the device and a plurality of timestamps, where each timestamp of the plurality of timestamps is associated with a consumable level of the plurality of consumable levels, ordering the plurality of consumable levels into a time-ordered sequence of consumable levels based on the associated timestamps, for at least one consumable level in the time-ordered sequence, determining, by a computing device, a value associated with the consumable level based on at least one earlier consumable level and at least one later consumable level in the time-ordered sequence, identifying, by the computing device, one or more historical consumable replacements based on the values for the plurality of consumable levels in the time-ordered sequence, and determining, by the computing device, one or more consumable lifetimes and one or more consumable yields based on the one or more historical consumable replacements. The method may further include determining, via the computing device, a failure copula based on the one or more consumable lifetimes and the one or more consumable yields for the plurality of consumables of the consumable type.

In an embodiment, a system for determining a failure copula for a consumable may include a computing device and a non-transitory storage medium in communication with the computing device. The storage medium contains one or more instructions that, when executed, cause the computing device to receive a plurality of consumable levels for a consumable and a plurality of timestamps from a remote device, where each timestamp of the plurality of timestamps is associated with a consumable level of the plurality of consumable levels, order the plurality of consumable levels into a time-ordered sequence of consumable levels based on the associated timestamps, for at least one consumable level in the time-ordered sequence, determine a value associated with the consumable level based on at least one earlier consumable level and at least one later consumable level in the time-ordered sequence, identify one or more historical consumable replacements based on the values associated with the at least one consumable level in the time-ordered sequence, determine one or more consumable lifetimes and one or more consumable yields based on the one or more historical consumable replacements, and determine a failure copula based on the one or more consumable lifetimes and the one or more consumable yields.

DETAILED DESCRIPTION

The following terms shall have, for the purposes of this application, the respective meanings set forth below.

A "computing device" refers to a computer, a processor and/or any other component, device or system that performs one or more operations according to one or more programming instructions. An example of a computing device is described in reference to FIG. 12.

A "consumable" refers to a substance, component or other portion of a device that is used over time. For example, consumables in a motor vehicle include gasoline, oil, and wiper blades. Similarly, consumables in a print device include, without limitation, ink, toner and/or the like.

A "consumable level" refers to an amount of a consumable remaining in a device. In some cases, a device may report a consumable level to a remote data warehouse on a periodic basis as part of a managed account service.

A "copula" or a "failure copula" refers to a mathematical construct used to describe the dependence between random variables. A copula is used to join two or more marginal distributions to form a joint probability distribution. A "Clayton copula" is a copula of the form $C(u,v)=\max([u^{-\theta}+v^{-\theta}-1]^{-1/\theta},0)$. The Clayton copula for a consumable device may be determined where u is a lifetime for a consumable, v is a yield for the consumable, and $\theta$ is estimated by maximum likelihood. The parameter $\theta$ identifies the degree of dependence between two random variables. For example, higher values of $\theta$ denote a greater dependence between the two random variables. This may be understood by at the resultant joint distribution. For relatively high values of $\theta$, the joint probability density function has much of the probability mass concentrated on a line, indicating that the two random variables are highly dependent (if one variable increases, the other has a high probability of increasing, too). For relatively low values of $\theta$, the joint probability density function is more spreadout, indicating that the random variables are more independent or loosely coupled. The value of $\theta$ may be estimated from the data used to produce the distribution.

A "historical consumable replacement" refers to an identification of a replacement of a consumable for a device. The historical consumable replacement may be estimated based on lifetime and yield information for a consumable received for a period of time.

A "machine" refers to a device used to perform a task. In a print production device, a machine may include, without limitation, a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

As used herein, the terms "sum," "product" and similar mathematical terms are construed broadly to include any method or algorithm in which a single datum is derived or calculated from a plurality of input data.

When estimating consumable levels in a field device, levels may be transmitted periodically by the device to a remote data warehouse operated by an account manager. The levels may provide a trajectory that can be used to estimate the actual lifetime and yield of a consumable in the field device. Once field values are estimated, the field values may be used to assist operators of managed accounts that do not have access to consumable levels for their accounts in order to ensure that the users of the consumables are requesting new consumables at appropriate times.

Figure 1:
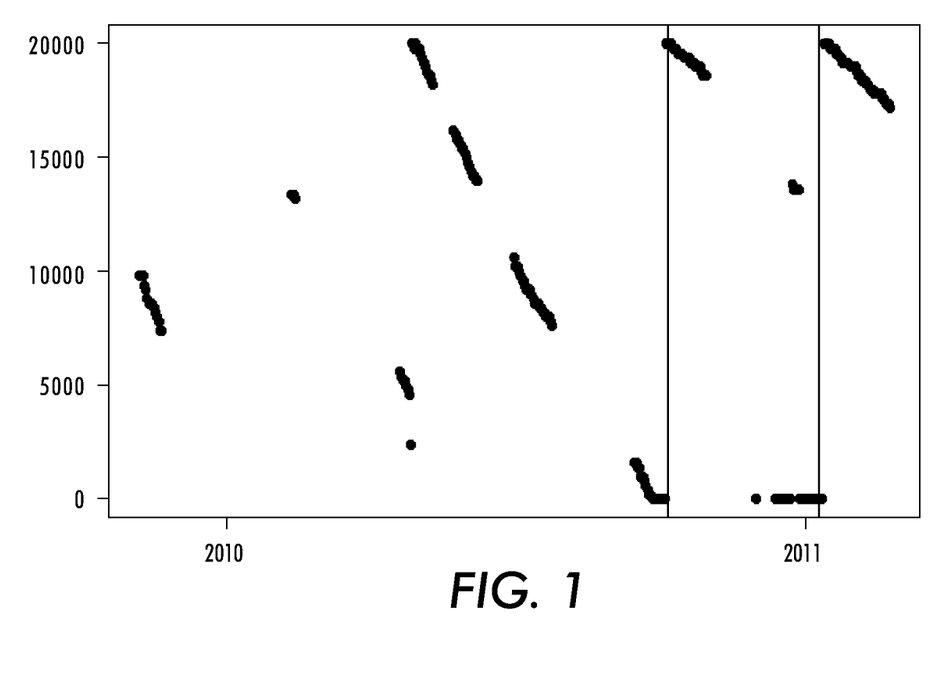
FIG. 1 depicts a graph of consumable levels for a device over a period of time.

One problem with determining consumable trajectory is that the data received from a field device may be "noisy." FIG. 1 depicts a graph of consumable levels for a device over a period of time. Among the problems exhibited in FIG. 1 are that gaps exist in the data (i.e., intermittent data reporting) and that the data occasionally drops to zero. The gaps in the data denote data that was not received by an account manager because of a faulty connection with the device or other system failure. As such, intermittent data may make it more difficult to determine whether a device requires a new consumable. However, the present disclosure describes methods and systems for estimating a lifetime distribution in the presence of such noise. It is noted that it is not necessary to measure all lifetimes; rather, only a subset of all lifetimes need to be determined in order to provide estimation of consumable yield.

Figure 2:
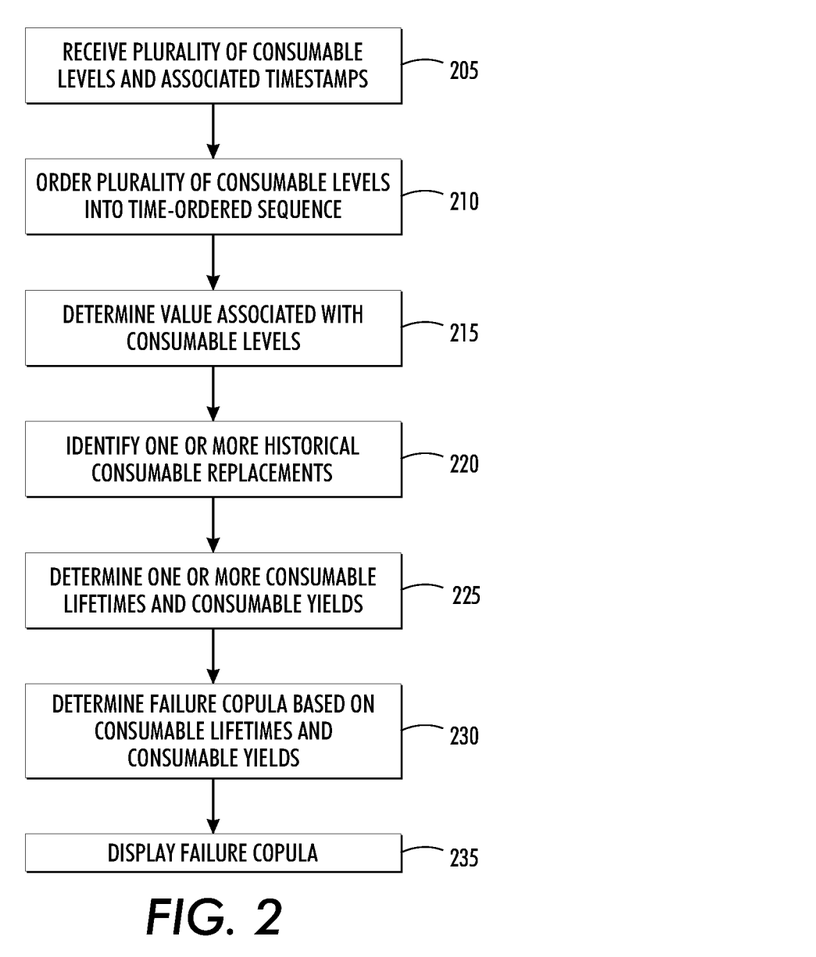
FIG. 2 depicts a flow diagram of a method of determining a failure copula for a consumable according to an embodiment.

FIG. 2 depicts a flow diagram of a method of determining a failure copula for a consumable according to an embodiment. As shown in FIG. 2, a plurality of consumable levels for a consumable and a plurality of timestamps may be received 205 from a remote device. Each timestamp may be associated with a corresponding consumable level based on the time when the consumable level was recorded. The consumable level may refer to the amount of a consumable in the remote device at the time identified by the associated timestamp.

The plurality of consumable levels may be ordered 210 into a time-ordered sequence of consumable levels based on the associated timestamps. In an embodiment, a consumable level may be ordered 210 prior to being received 205 from the remote device. Alternately, the consumable levels may be received periodically over a period of time and stored in a time-ordered sequence 210 based upon the time at which the consumable levels are received 205. Alternate methods for ordering the consumable levels may also be performed within the scope of this disclosure.

Figure 3:
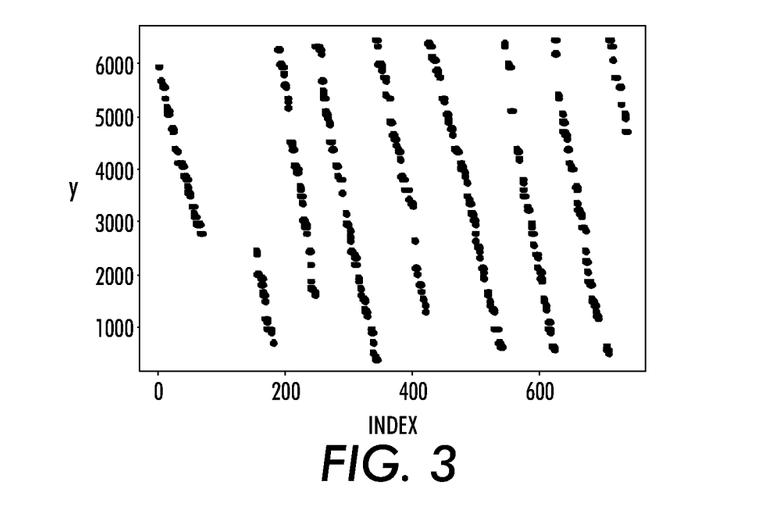
FIG. 3 depicts a graph of a time-ordered sequence of consumable levels for a device.

FIG. 3 depicts a graph of a time-ordered sequence of consumable levels for a device. As shown in FIG. 3, the consumable level may decrease over time until a minimum consumable level is achieved (i.e., when the consumable is completely consumed or almost completely consumed). When the consumable is replaced, the consumable level may increase to a completely unconsumed (or almost completely unconsumed) amount. The intermediate values of the consumable level identify the consumable level at intermediate times. As such, FIG. 3 depicts a consumable that appears to have been replaced 7 times during the identified period of time.

Referring back to FIG. 2, a computing device may then determine 215 a value associated with each of at least one consumable level in the time-ordered sequence based on at least one earlier consumable level and at least one later consumable level in the time-ordered sequence. For example, the value for a particular consumable level may be determined 215 by identifying a first set of consecutive consumable levels of the time-ordered sequence and a second set of consecutive consumable levels. The consumable levels in the first set may be consumable levels that occur before the particular consumable level for which the value is being determined 215 in the time-ordered sequence. Conversely, the consumable levels in the second set may be consumable levels that occur after the particular consumable level for which the value is being determined 215 in the time-ordered sequence. In an embodiment, the first set of consumable levels may have the same number of consumable levels as the second set of consumable levels.

A first linear model may be fit to the first set of consumable levels, and a second linear model may be fit to the second set of consumable levels. The first linear model may be characterized by a first slope and a first intercept. In an embodiment, the first linear model may be fit to the first set of consumable levels using a least squares model of the form $y=m_L x+B_L$, where $m_L$ is the first slope and $b_L$ is the first intercept. Similarly, the second linear model may be characterized by a second slope and a second intercept. The second linear model may be fit to the second set of consumable levels using a least squares model of the form $y=m_R x+b_R$, where $m_R$ is the second slope and $b_R$ is the second intercept. The value associated with the consumable level may then be determined based on the slopes and intercepts for the first and second linear models. In an embodiment, the value associated with the consumable level may be determined using the following equation:

$$z = m_R\left(i + \frac{n}{2} + 1\right) + b_R - \left(m_L\left(i + \frac{n}{2}\right) + b_L\right),$$

where i is a number of the first consumable level in the first set of consumables, and n is a combined number of consumable levels in the first and second sets of consumable levels.

Figure 4:
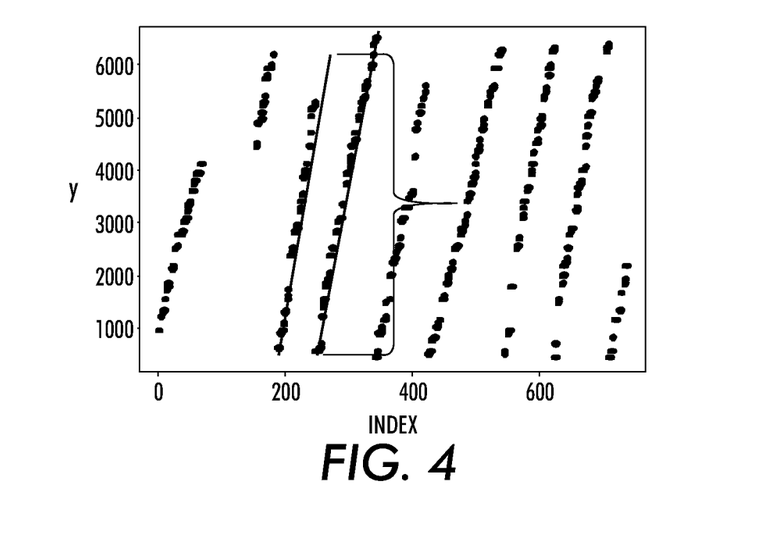
FIG. 4 shows a difference in curve fits for left and right halves of the moving window for a particular consumable level.

For example, to identify a change point, a moving window of, for example and without limitation, 60 observations may be moved across the data depicted in FIG. 3. Lines may then be fitted to left and right (i.e., earlier-in-time and later-in-time) halves of the moving window. The consumable levels may be identified as $[y_{i+1}, \ldots, y_{i+30}]$ for the left half and $[y_{i+31}, \ldots, y_{i+60}]$ for the right half. Two linear models may be fitted using ordinary least squares, $y=m_L x+b_L$ for the left half and $y=m_R x+b_R$ for the right half. A jump occurs when the difference $$z = m_R\left(i + \frac{60}{2} + 1\right) + b_R - \left(m_L\left(i + \frac{60}{2}\right) + b_L\right)$$

is greatest. FIG. 4 shows a difference in curve fits for examples of left and right halves of the moving window for a particular jump (i.e., consumable replacement). Alternate methods of determining the above-identified value associated with a consumable level may be determined within the scope of this disclosure.

Referring back to FIG. 2, the computing device may then identify 220 one or more historical consumable replacements based on the values associated with the at least one consumable level in the time-ordered sequence. In an embodiment, identifying 220 one or more historical consumable replacements may include identifying at least one value associated with the at least one consumable level that exceeds a threshold value.

Figure 5:
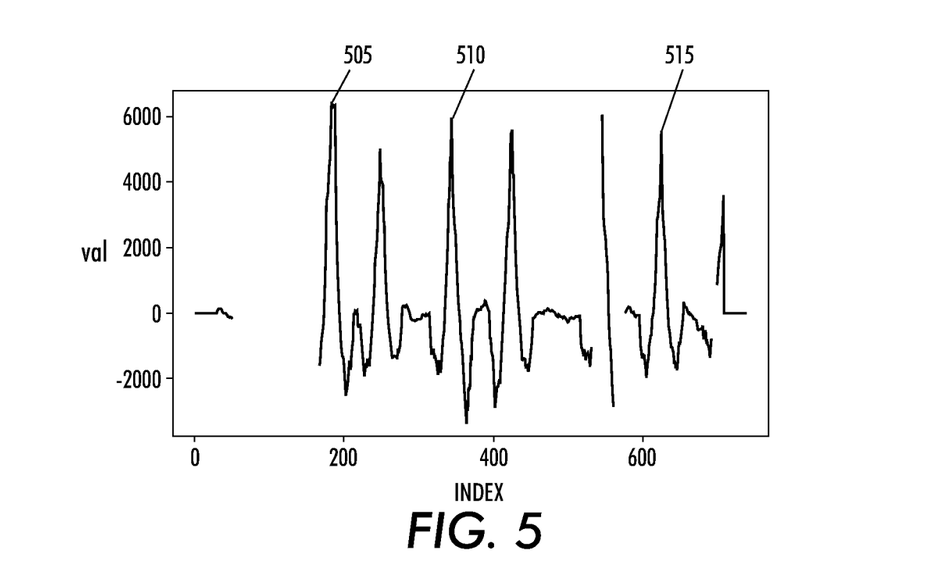
FIG. 5 depicts values associated with consumable levels based on the data contained in FIG. 3.
Figure 6:
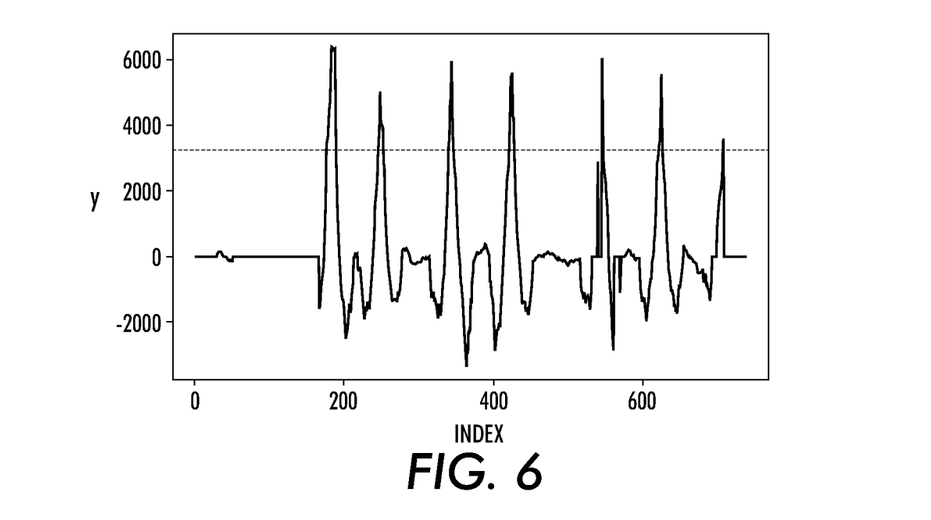
FIG. 6 depicts an example of a threshold value applied with respect to the data in FIG. 5.

FIG. 5 depicts values of z (the values associated with consumable levels) based on the data contained in FIG. 3. In an embodiment, the centers of the spikes depicted in FIG. 5, such as 505, 510 and 515, may be determined using a threshold value. For example, a threshold value of approximately 50% of a maximum consumable level may be used, although other thresholds may be used within the scope of this disclosure. FIG. 6 depicts an example of a threshold value applied with respect to the data in FIG. 5.

Figure 7:
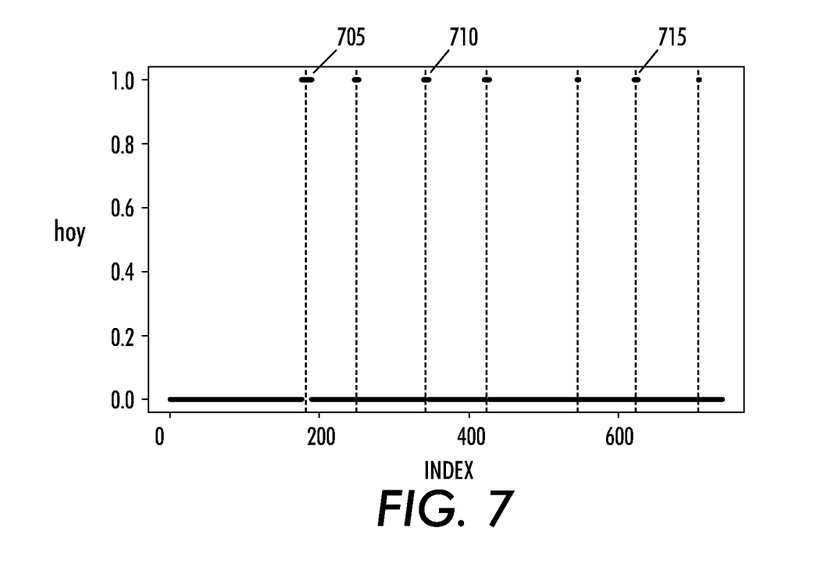
FIG. 7 depicts a graph resulting from the application of an indicator function to the thresholded data in FIG. 6.
Figure 8:
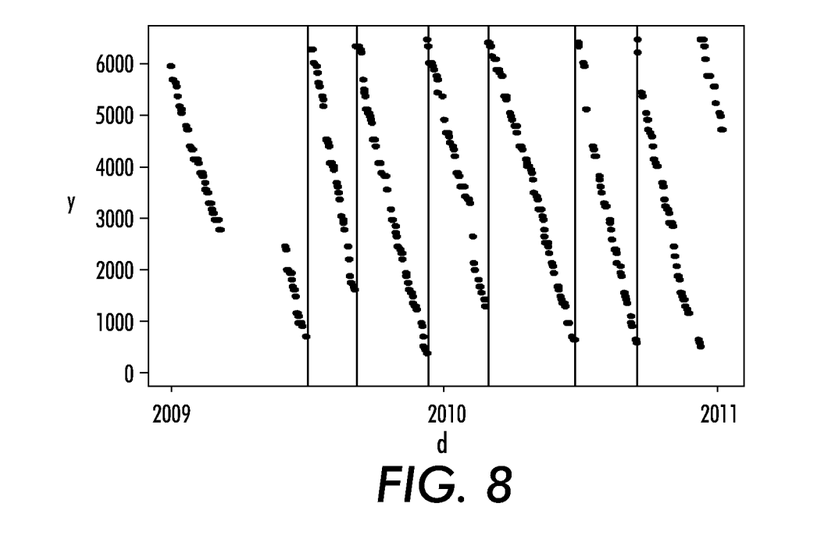
FIG. 8 depicts a graph of the identification of the consumable replacements depicted in FIG. 7 overlaid on the data included in FIG. 3.

In an embodiment, an indicator function may further be used to identify the center of the spikes. The indicator function may equal 1 if the value associated with the consumable level is greater than the threshold value and 0 if the value associated with the consumable level is less than the threshold value. FIG. 7 depicts a graph of the indicator function as applied to the thresholded data in FIG. 6. The start and end points of the positions where the indicator function equals 1 are determined. From these values, the mid-points of the jumps are determined. These jumps are represented by dashed lines, such as 705, 710 and 715, in FIG. 7. FIG. 8 depicts a graph of the jumps depicted in FIG. 7 overlaid on the data included in FIG. 3. As such one or more historical consumable replacements may be identified using the above-described methods. Alternate methods may also be used within the scope of this disclosure.

Referring back to FIG. 2, the computing device may determine 225 one or more consumable lifetimes and one or more consumable yields based on the one or more historical consumable replacements. For example, Table 1 contains an example list of consumable lifetimes and yields. In particular, Table 1 depicts the number of impressions and the number of days between historical consumable replacements for a particular device based on the information from FIG. 8.

TABLE 1

Consumable Lifetimes and Yields for Data in FIG.8

| Description | Days | Yield (Impressions) |
|---|---|---|
| Toner Cartridge X | 67 | 21812 |
| Toner Cartridge X | 93 | 25950 |
| Toner Cartridge X | 81 | 27574 |
| Toner Cartridge X | 123 | 30339 |
| Toner Cartridge X | 77 | 22758 |
| Toner Cartridge X | 84 | 22472 |

Alternate and/or additional values associated with a consumable level may be determined within the scope of this disclosure.

A joint distribution for lifetimes and yields for the consumable may then be estimated. In particular, the computing device may determine 230 a failure copula based on the one or more consumable lifetimes and the one or more consumable yields. In an embodiment, the failure copula may be a Clayton copula. In some cases, the data extracted from various devices may be sparse because of intermittent updates provided by the device or other data quality issues. As such, data may be "cleaned" by removing, for example and without limitation, the top 5% and the bottom 5% of the data.

Figure 9A:
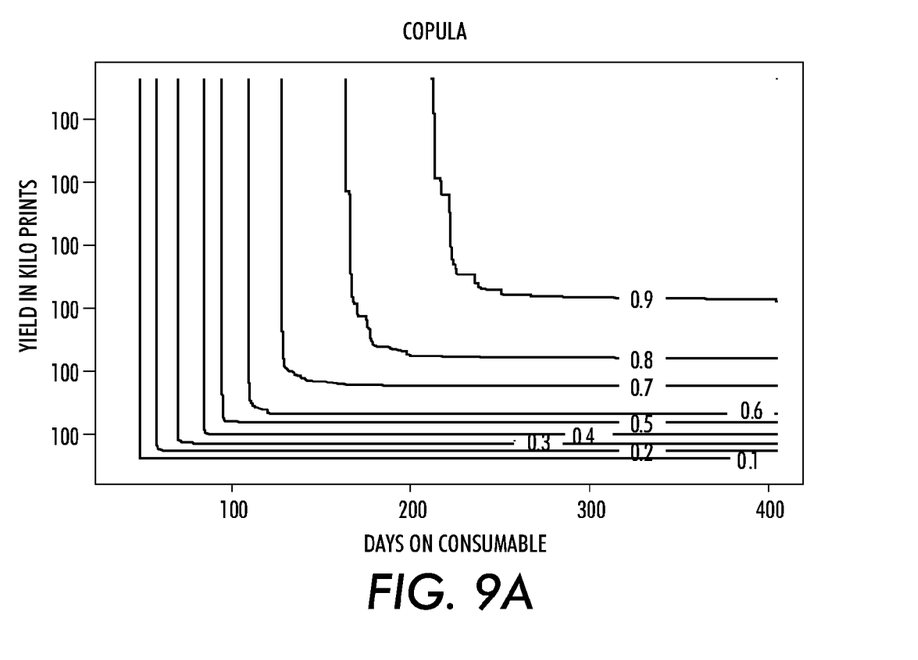
FIGS. 9A and 9B depict graphs of example of copulas for different device types according to an embodiment.
Figure 9B:
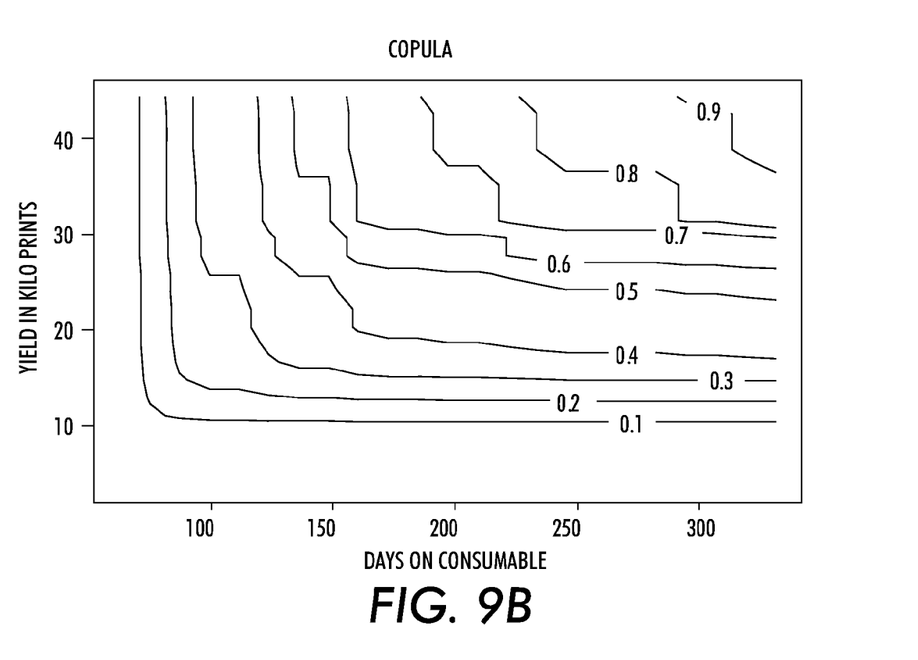

In an embodiment, the failure copula may be displayed 235 to a user. For example, the failure copula may be displayed 235 on a display device in operable communication with the computing device, such as via the Internet, an intranet, or any other means of connecting the display to the computing device. Alternately, the failure copula may be displayed 235 by printing the failure copula on a printing device or any other applicable means of displaying such information. Examples of failure copulas are depicted in FIGS. 9A and 9B.

The displayed information may be used to make a decision regarding a request for a new consumable. For example, if a request for a consumable is received when the current information for the consumable lifetime and consumable yield place the consumable information in the 90th percentile, a new consumable may be ordered and delivered to the owner of the remote device. Conversely, if a request for a consumable is received when the current information for the consumable lifetime and consumable yield place the consumable information in the 10th percentile, a new consumable may not be ordered or may not be ordered without further investigation of the ordering habits of the owner of the remote device. Other actions may also be taken within the scope of this disclosure based on the information provided as a result of comparing the failure copula with the current information for the remote device.

Figure 10:
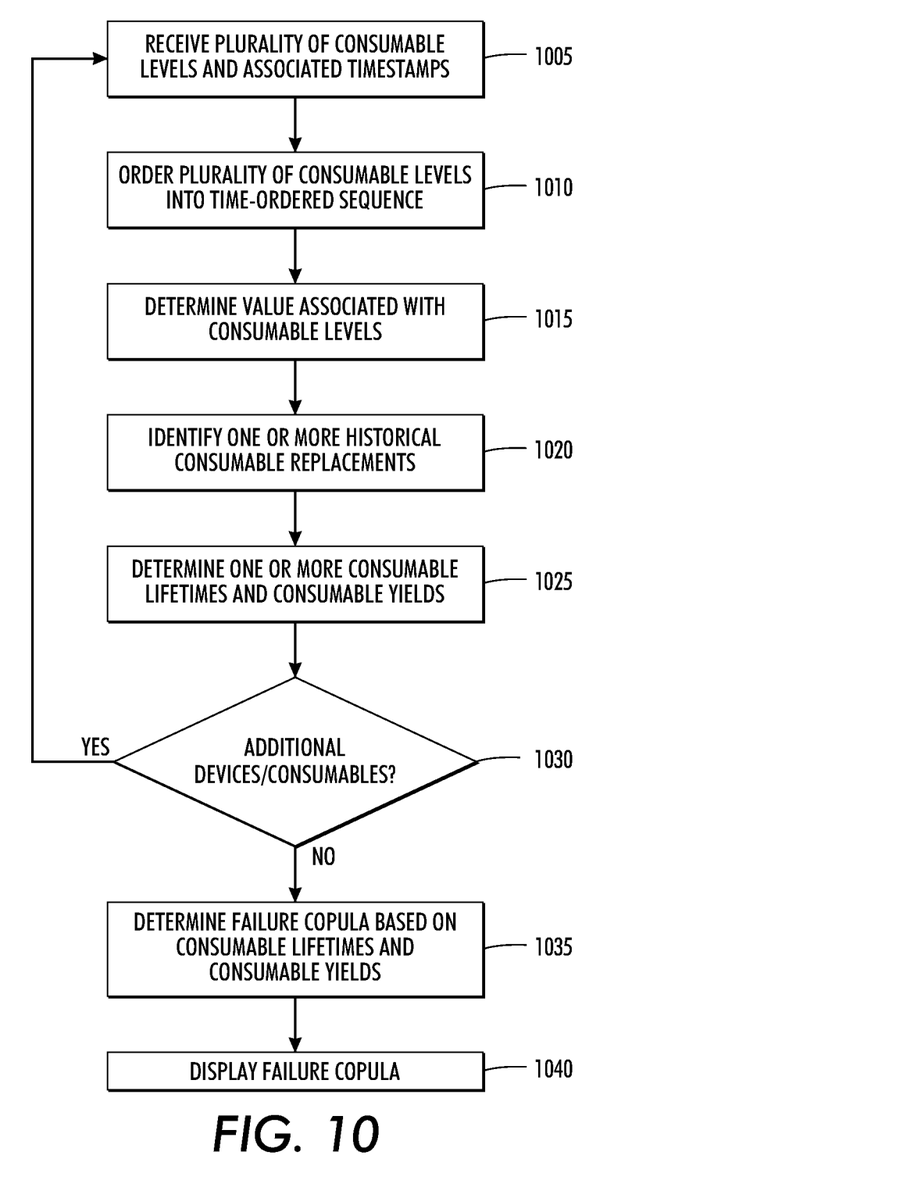
FIG. 10 depicts a flow diagram of an alternate method for determining a failure copula for a consumable according to an embodiment.

FIG. 10 depicts a flow diagram of an alternate method of determining a failure copula according to an embodiment. As shown in FIG. 10, operations similar to those described above in reference to FIG. 2 may be performed for each of a plurality of remote devices, where each remote device has a common device type. More particularly, a plurality of consumable levels for a device and a plurality of timestamps may be received 1005. Each timestamp of the plurality of timestamps may be associated with a consumable level of the plurality of consumable levels. The plurality of consumable levels may be ordered 1010 into a time-ordered sequence of consumable levels based on the associated timestamps. For at least one consumable level in the time-ordered sequence, a computing device may determine 1015 a value associated with the consumable level based on at least one earlier consumable level and at least one later consumable level in the time-ordered sequence. The computing device may identify 1020 one or more historical consumable replacements based on the values for the plurality of consumable levels in the time-ordered sequence, and determine 1025 one or more consumable lifetimes or one or more consumable yields based on the one or more historical consumable replacements. The computing device may then determine 1030 whether consumable lifetimes and/or consumable yields are to be determined for additional devices having a common device type, consumables having a common consumable type, or devices using a consumable having a common consumable type. If so, the computing device may repeat at least the determining a value (1015), identifying one or more historical consumable replacements (1020) and determining one or more consumable lifetimes or one or more consumable yields (1025) operations listed above. In an embodiment, the computing device may further receive a plurality of consumable levels and associated timestamps (1005) and order the plurality of consumable levels into a time-ordered sequence (1010). The computing device may determine 1035 a failure copula based on the one or more consumable lifetimes and the one or more consumable yields for the plurality of consumables of the consumable type.

In an embodiment, determining 1015 a value for the consumable level may include identifying a first set of consecutive consumable levels of the time-ordered sequence and a second set of consumable levels of the time-ordered sequence in the range, wherein the first set of consecutive consumable levels are before the consumable level in the time-ordered sequence and the second set of consecutive consumable levels are after the consumable level in the time-ordered sequence, fitting a first linear model to the first set of consumable levels, wherein the first linear model comprises a first slope and a first intercept, fitting a second linear model to the second set of consumable levels, wherein the second linear model comprises a second slope and a second intercept, and determining a value for the consumable level based on the first and second slopes and the first and second intercepts.

In an embodiment, determining 1015 a value for the consumable level may include identifying a first set of consecutive consumable levels of the time-ordered sequence and a second set of consumable levels of the time-ordered sequence in the range, wherein the first set of consecutive consumable levels are before the consumable level in the time-ordered sequence and the second set of consecutive consumable levels are after the consumable level in the time-ordered sequence, fitting a first linear model to the first set of consumable levels, wherein the first linear model comprises a first slope and a first intercept, fitting a second linear model to the second set of consumable levels, wherein the second linear model comprises a second slope and a second intercept, and determining a value for the consumable level based on the first and second slopes and the first and second intercepts. In an embodiment, the first and second sets of consumable levels may include an equal number of consumable levels. In an embodiment, fitting a first linear model comprises fitting a least squares model of the form $y = m_L x + b_L$ to the first set of consumable levels, where $m_L$ is the first slope and $b_L$ is the first intercept, fitting a second linear model comprises fitting a least squares model of the form $y = m_R x + b_R$ to the second set of consumable levels, where $m_R$ is the second slope and $b_R$ is the second intercept, and determining a value for the consumable level comprises determining the value using the following equation, $$z = m_R\left(i + \frac{n}{2} + 1\right) + b_R - \left(m_L\left(i + \frac{n}{2}\right) + b_L\right),$$

where i is a number of the first consumable level in the first set of consumables, and n is a combined number of consumable levels in the first and second sets of consumable levels.

In an embodiment, identifying 1020 one or more historical consumable replacements may include identifying values for the consumable levels that exceed a threshold value. In an embodiment, the threshold value may be about 50% of a maximum consumable level for the consumable.

In an embodiment, the failure copula comprises a Clayton copula. In an embodiment, the failure copula may be displayed 1040 to a user. For example, the failure copula may be displayed 1040 on a display device in operable communication with the computing device, such as via the Internet, an intranet, or any other means of connecting the display to the computing device. Alternately, the failure copula may be displayed 1040 by printing the failure copula on a printing device or any other applicable means of displaying such information.

Figure 11:
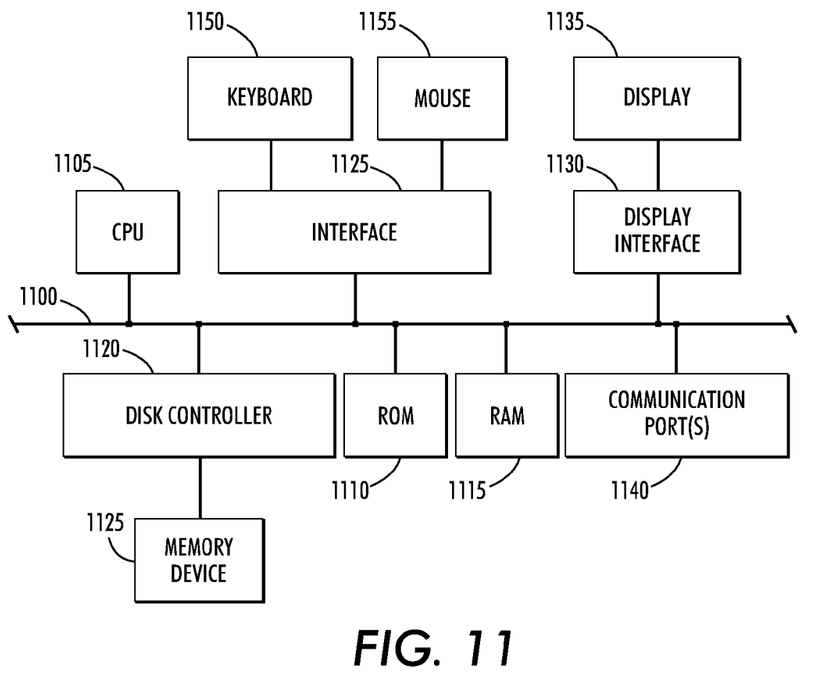
FIG. 11 depicts a block diagram of internal hardware that may be used to contain or implement program instructions according to an embodiment.

FIG. 11 depicts a block diagram of internal hardware that may be used to contain or implement program instructions, such as the process steps discussed above in reference to FIG. 2, according to embodiments. A bus 1100 serves as the main information highway interconnecting the other illustrated components of the hardware. CPU 1105 is the central processing unit of the system, performing calculations and logic operations required to execute a program. CPU 1105, alone or in conjunction with one or more of the other elements disclosed in FIG. 11, is an example of a processing device, computing device or processor as such terms are used within this disclosure. Read only memory (ROM) 1110 and random access memory (RAM) 1115 constitute examples of memory devices (i.e., processor-readable non-transitory storage media).

A controller 1120 interfaces with one or more optional memory devices 1125 to the system bus 1100. These memory devices 1125 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1110 and/or the RAM 1115. Optionally, the program instructions may be stored on a tangible computer-readable storage medium such as a compact disk, a digital disk, flash memory, a memory card, a USB drive, an optical disc storage medium, such as a Blu-ray™ disc, and/or other non-transitory storage media.

An optional display interface 1130 may permit information from the bus 1100 to be displayed on the display 1135 in audio, visual, graphic or alphanumeric format. Communication with external devices, such as a print device, may occur using various communication ports 1140. A communication port 1140 may be attached to a communications network, such as the Internet or an intranet.

The hardware may also include an interface 1145 which allows for receipt of data from input devices such as a keyboard 1150 or other input device 1155 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of determining a failure copula for a consumable, the method comprising: receiving a plurality of consumable levels for a consumable and a plurality of timestamps from a remote device, wherein each timestamp of the plurality of timestamps is associated with a consumable level of the plurality of consumable levels;
   ordering the plurality of consumable levels into a time-ordered sequence of consumable levels based on the associated timestamps;
   for at least one consumable level in the time-ordered sequence, determining, by a computing device, a value associated with the consumable level based on at least one earlier consumable level and at least one later consumable level in the time-ordered sequence;
   identifying, by the computing device, one or more historical consumable replacements based on the values associated with the at least one consumable level in the time-ordered sequence;
   determining, by the computing device, one or more consumable lifetimes and one or more consumable yields based on the one or more historical consumable replacements; and
   determining, by the computing device, a failure copula based on the one or more consumable lifetimes and the one or more consumable yields.

2. The method of claim 1, wherein determining a value associated with the consumable level comprises:
   identifying a first set of consecutive consumable levels of the time-ordered sequence and a second set of consecutive consumable levels of the time-ordered sequence in the range, wherein the first set of consecutive consumable levels are before the consumable level in the time-ordered sequence and the second set of consecutive consumable levels are after the consumable level in the time-ordered sequence;
   fitting a first linear model to the first set of consumable levels, wherein the first linear model comprises a first slope and a first intercept;
   fitting a second linear model to the second set of consumable levels, wherein the second linear model comprises a second slope and a second intercept; and
   determining the value associated with the consumable level based on the first and second slopes and the first and second intercepts.

3. The method of claim 2, wherein the first and second sets of consumable levels comprise an equal number of consumable levels.

4. The method of claim 2, wherein:
   fitting a first linear model comprises fitting a least squares model of the form $y=m_L x+b_L$ to the first set of consumable levels, where $m_L$ is the first slope and $b_L$ is the first intercept;
   fitting a second linear model comprises fitting a least squares model of the form $y=m_R x+b_R$ to the second set of consumable levels, where $m_R$ is the second slope and $b_R$ is the second intercept; and
   determining a value associated with the consumable level comprises determining the value using the following equation, $$z = m_R\left(i + \frac{n}{2} + 1\right) + b_R - \left(m_L\left(i + \frac{n}{2}\right) + b_L\right),$$

where i is a number of the first consumable level in the first set of consumables, and n is a combined number of consumable levels in the first and second sets of consumable levels.

5. The method of claim 1, wherein identifying one or more historical consumable replacements comprises: identifying at least one value associated with the at least one consumable level that exceeds a threshold value.

6. The method of claim 5, wherein the threshold value comprises about 50% of a maximum consumable level for the consumable.

7. The method of claim 1, wherein the failure copula comprises a Clayton copula.

8. The method of claim 1, further comprising: displaying the failure copula to a user.

9. A method of determining a failure copula for a consumable type, the method comprising:
   for each of a plurality of devices, wherein each device of the plurality of devices has a common device type:
      receiving a plurality of consumable levels for the device and a plurality of timestamps from the device, wherein each timestamp of the plurality of timestamps is associated with a consumable level of the plurality of consumable levels,
      ordering the plurality of consumable levels into a time-ordered sequence of consumable levels based on the associated timestamps,
      for at least one consumable level in the time-ordered sequence, determining, by a computing device, a value associated with the consumable level based on at least one earlier consumable level and at least one later consumable level in the time-ordered sequence,
      identifying, by the computing device, one or more historical consumable replacements based on the values for the plurality of consumable levels in the time-ordered sequence, and determining, by the computing device, one or more consumable lifetimes and one or more consumable yields based on the one or more historical consumable replacements; and determining, by the computing device, a failure copula based on the one or more consumable lifetimes and the one or more consumable yields for the plurality of consumables of the consumable type.

10. The method of claim 9, wherein determining a value associated with the consumable level comprises:

identifying a first set of consecutive consumable levels of the time-ordered sequence and a second set of consumable levels of the time-ordered sequence in the range, wherein the first set of consecutive consumable levels are before the consumable level in the time-ordered sequence and the second set of consecutive consumable levels are after the consumable level in the time-ordered sequence;

fitting a first linear model to the first set of consumable levels, wherein the first linear model comprises a first slope and a first intercept;

fitting a second linear model to the second set of consumable levels, wherein the second linear model comprises a second slope and a second intercept; and determining a value associated with the consumable level based on the first and second slopes and the first and second intercepts.

11. The method of claim 10, wherein the first and second sets of consumable levels comprise an equal number of consumable levels.

12. The method of claim 10, wherein:

fitting a first linear model comprises fitting a least squares model of the form $y = m_L x + b_L$ to the first set of consumable levels, where $m_L$ is the first slope and $b_L$ is the first intercept;

fitting a second linear model comprises fitting a least squares model of the form $y = m_R x + b_R$ to the second set of consumable levels, where $m_R$ is the second slope and $b_R$ is the second intercept; and determining a value associated with the consumable level comprises determining the value using the following equation, $$z = m_R\left(i + \frac{n}{2} + 1\right) + b_R - \left(m_L\left(i + \frac{n}{2}\right) + b_L\right),$$

where i is a number of the first consumable level in the first set of consumables, and n is a combined number of consumable levels in the first and second sets of consumable levels.

13. The method of claim 9, wherein identifying one or more historical consumable replacements comprises: identifying at least one value associated with the at least one consumable level that exceeds a threshold value.

14. The method of claim 13, wherein the threshold value comprises about 50% of a maximum consumable level for the consumable.

15. The method of claim 9, wherein the failure copula comprises a Clayton copula.

16. A system for determining a failure copula for a consumable, the system comprising:

a computing device; and a non-transitory storage medium in communication with the computing device, wherein the storage medium contains one or more instructions that, when executed, cause the computing device to:

receive a plurality of consumable levels for a consumable and a plurality of timestamps from a remote device, wherein each timestamp of the plurality of timestamps is associated with a consumable level of the plurality of consumable levels, order the plurality of consumable levels into a time-ordered sequence of consumable levels based on the associated timestamps, for at least one consumable level in the time-ordered sequence, determine a value associated with the consumable level based on at least one earlier consumable level and at least one later consumable level in the time-ordered sequence, identify one or more historical consumable replacements based on the values associated with the at least one consumable level in the time-ordered sequence, determine one or more consumable lifetimes and one or more consumable yields based on the one or more historical consumable replacements, and determine a failure copula based on the one or more consumable lifetimes and the one or more consumable yields.

17. The system of claim 16, wherein the one or more instructions that, when executed, cause the computing device to determine a value associated with the consumable level comprise one or more instructions that, when executed, cause the computing device to:

identify a first set of consecutive consumable levels of the time-ordered sequence and a second set of consumable levels of the time-ordered sequence in the range, wherein the first set of consecutive consumable levels are before the consumable level in the time-ordered sequence and the second set of consecutive consumable levels are after the consumable level in the time-ordered sequence;

fit a first linear model to the first set of consumable levels, wherein the first linear model comprises a first slope and a first intercept;

fit a second linear model to the second set of consumable levels, wherein the second linear model comprises a second slope and a second intercept; and determine a value associated with the consumable level based on the first and second slopes and the first and second intercepts.

18. The system of claim 17, wherein the first and second sets of consumable levels comprise an equal number of consumable levels.

19. The system of claim 17, wherein:

the one or more instructions that, when executed, cause the computing device to fit a first linear model comprise one or more instructions that, when executed, cause the computing device to fit a least squares model of the form $y = m_L x + b_L$ to the first set of consumable levels, where $m_L$ is the first slope and $b_L$ is the first intercept;

the one or more instructions that, when executed, cause the computing device to fit a second linear model comprise one or more instructions that, when executed, cause the computing device to fit a least squares model of the form $y = m_R x + b_R$ to the second set of consumable levels, where $m_R$ is the second slope and $b_R$ is the second intercept; and the one or more instructions that, when executed, cause the computing device to determine a value associated with the consumable level comprise one or more instructions that, when executed, cause the computing device to determine the value using the following equation, $$z = m_R\left(i + \frac{n}{2} + 1\right) + b_R - \left(m_L\left(i + \frac{n}{2}\right) + b_L\right),$$

where i is a number of the first consumable level in the first set of consumables, and n is a combined number of consumable levels in the first and second sets of consumable levels.

20. The system of claim 16, wherein the one or more instructions that, when executed, cause the computing device to identify one or more historical consumable replacements comprise one or more instructions that, when executed, cause the computing device to identify at least one value associated with the at least one consumable level that exceeds a threshold value.

* * * * *